United States Patent
Hansen et al.

(10) Patent No.: US 9,444,376 B2
(45) Date of Patent: Sep. 13, 2016

(54) VARIABLE LINK SENSORLESS BRUSHLESS DIRECT CURRENT MOTOR CONTROLLER FOR SPACE AND HARDENED APPLICATIONS

(71) Applicant: Hamilton Sundstrand Corporation, Windsor Locks, CT (US)

(72) Inventors: Harold J. Hansen, Hamden, CT (US); Robert P. Wichowski, Westfield, MA (US); Kevin G. Hawes, Windsor Locks, CT (US); Patrick J. Sears, South Hadley, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 134 days.

(21) Appl. No.: 13/774,504

(22) Filed: Feb. 22, 2013

(65) Prior Publication Data
US 2014/0239864 A1    Aug. 28, 2014

(51) Int. Cl.
*H02P 6/00* (2016.01)
*H02P 27/04* (2016.01)
*H02P 6/18* (2016.01)
*H02P 7/06* (2006.01)
*H02P 6/12* (2006.01)

(52) U.S. Cl.
CPC .............. *H02P 6/182* (2013.01); *H02P 7/06* (2013.01); *H02P 6/12* (2013.01)

(58) Field of Classification Search
CPC ... H02P 6/182; H02P 21/146; H02K 7/1023; H01L 31/115; H01L 27/14659; H01L 2924/3025

USPC ................................................... 318/400.35
See application file for complete search history.

(56) References Cited

U.S. PATENT DOCUMENTS

| | | | |
|---|---|---|---|
| 4,694,210 A | 9/1987 | Elliott et al. | |
| 5,070,264 A | 12/1991 | Conrad | |
| 5,384,527 A | 1/1995 | Rozman et al. | |
| 5,495,162 A | 2/1996 | Rozman et al. | |
| 5,723,967 A | 3/1998 | Hongo et al. | |
| 5,886,486 A | 3/1999 | Jeong et al. | |
| 5,949,204 A | 9/1999 | Huggett et al. | |
| 5,990,643 A * | 11/1999 | Holling et al. | 318/400.34 |
| 6,081,091 A | 6/2000 | Mitchell et al. | |

(Continued)

OTHER PUBLICATIONS

Gamazo-Real et al "Position and Speed Control of Brushless DC Motors Using Sensorless Techniques and Application Trends", Jun. 10, 2010, Department of Signal Theory, Communications and Telematic Engineering, University of Valladolid (UVA), 47011 Valladolid, Spain. ISSN 1424-8220 pp. 6901-6947.*

(Continued)

*Primary Examiner* — Bentsu Ro
*Assistant Examiner* — Zemenay Truneh
(74) *Attorney, Agent, or Firm* — Carlson, Gaskey & Olds, P.C.

(57) ABSTRACT

A sensorless motor controller includes a variable link control, including a radiation-hardened field programmable gate array (FPGA) and a back electromotive force (EMF) decoder circuit. The back EMF decoder infers the position of a rotor of the motor. A filter on the decoder conditions the back EMF signal and has multiple cutoff frequencies which can be dynamically controlled by the FPGA in order to compensate for phase shift in the back EMF signal. The FPGA also controls a variable DC link and its digital speed control loop.

21 Claims, 3 Drawing Sheets

(56) References Cited

U.S. PATENT DOCUMENTS

| | | | |
|---|---|---|---|
| 6,559,616 B2* | 5/2003 | Aoki et al. | 318/567 |
| 6,686,714 B2* | 2/2004 | Trifilo | 318/400.34 |
| 6,901,212 B2 | 5/2005 | Masino | |
| 7,030,582 B2 | 4/2006 | Masino | |
| 7,072,778 B2* | 7/2006 | Swanson | 702/57 |
| 7,239,098 B2 | 7/2007 | Masino | |
| 7,477,034 B2* | 1/2009 | MacKay | 318/432 |
| 7,723,931 B2 | 5/2010 | Dooley | |
| 8,294,396 B2 | 10/2012 | Wichowski | |
| 2003/0231875 A1* | 12/2003 | Masino | H02P 6/12 388/800 |
| 2008/0224641 A1 | 9/2008 | Hoogzaad | |
| 2010/0295490 A1* | 11/2010 | Kuroshima et al. | 318/400.35 |
| 2011/0006713 A1* | 1/2011 | Wichowski | 318/400.13 |
| 2011/0210688 A1 | 9/2011 | Dooley et al. | |
| 2012/0043919 A1* | 2/2012 | Lee et al. | 318/400.11 |
| 2012/0249034 A1 | 10/2012 | Dooley | |

OTHER PUBLICATIONS

Gazmano-Real, Jose. Position and Speed Control of Brushless DC Motors Using Sensorless Techniques and Application Trends. Sensors 2010, 10, pp. 6901-6947.*

Gazmano-Real, Jose. Position and Speed Control of Brushless Dc Motors Using Sensorless Techniques and Application Trends. Sensors 2010, 10, pp. 6901-694.*

Umamahesh, P. Sensorless Brushless DC Motor Drive by Using DC Link Measurement. International Journal of Engineering Research and Applications. vol. 2, Issue 3, May-Jun. 2012, pp. 1200-1206.

European Search Report for European Application No. 14158300.5 dated Jan. 29, 2015.

* cited by examiner

VARIABLE LINK SENSORLESS BRUSHLESS DIRECT CURRENT MOTOR CONTROLLER FOR SPACE AND HARDENED APPLICATIONS

BACKGROUND

Motors in space and hardened applications can have environmental constraints, including radiation and thermal constrains, that place extreme demands on the motor. The size and weight of these motors are also taken into account, as the costs of weight and volume are important considerations for hardware that will be launched into space. Finally, since these motors are often part of complex instruments that make very sensitive measurements, the generation of minimal and predictable electromagnetic interference (EMI) is critical.

Sensorless motor controllers detect the position of the rotor in order to properly commutate the motor. One technique that can be used is called back electromotive force (EMF) sensing. The concept behind back EMF detection is that the position of a rotor can be detected by looking at the back EMF on windings within the motor. Current designs use a technique where the back EMF is measured in respect to a pseudo ground representing the actual neutral of the stator winding.

The speed of the motor is controlled as well. Typically this is accomplished by applying a pulse width modulation (PWM) pattern to either high side or low side field effect transistors (FETs), or both. This results in high power losses due to high frequency switching waveforms as well as wide-band frequency spectrum noise.

Furthermore, current sensorless motor designs are often bulky, and unsuitable for use in high-temperature and high-radiation applications, such as space-based applications. Motor placement in machines used for such applications is generally not conducive to shielding sensitive components from high temperature and radiation, and in some cases the motor or the device it drives operates at high temperatures. Many components currently used in motor control systems cannot withstand these types of operating conditions.

SUMMARY

An example system includes a back electromotive force (EMF) detector circuit that consists of the following elements: a variable frequency filter, an AC coupled amplifier, a zero crossing detector, and a Schmidt trigger circuit that creates pseudo commutation sequence based on back EMF waveforms.

Another example system includes a variable link controller consisting of a forward, full wave or bridge converter that adjusts a DC link voltage in respect to speed allowing for regulation of motor voltage and speed.

Another example system includes a field programmable gate array (FPGA) that reads the pseudo commutation sequence and provides for proper commutation and adjustment of the DC link voltage in response to a desired speed command.

Another example system includes an FPGA that performs asynchronous start-up of the motor through adjustable timing and control of the variable frequency filter in the back EMF decoder to minimize phase shift as a function of motor speed.

Another example system includes an FPGA that monitors outputs of a current limiter circuit and adjusts both commutation and DC link in response to current levels. The current limit circuit monitors both peak and average current levels.

An example method of controlling a motor includes receiving a back electromotive force signal from the rotor of the motor at a back electromotive force decoder circuit in a motor controller. The decoder circuit is at least partially controlled by a field programmable gate array. The back electromotive force signal is conditioned with a filter having adjustable cutoff frequencies. A position of the rotor is determined from the condition back electromotive force signal. A voltage is supplied to drive the motor based on the position of the rotor.

An example satellite application includes a motor, a motor controller, and a target device driven by the motor. The motor controller includes a hardened field programmable gate array. The back electromotive force decoder circuit includes a filter configured to condition a back electromotive force signal. The filter has multiple cutoff frequencies. These frequencies are dynamically controlled by the field programmable gate array as a function of speed.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
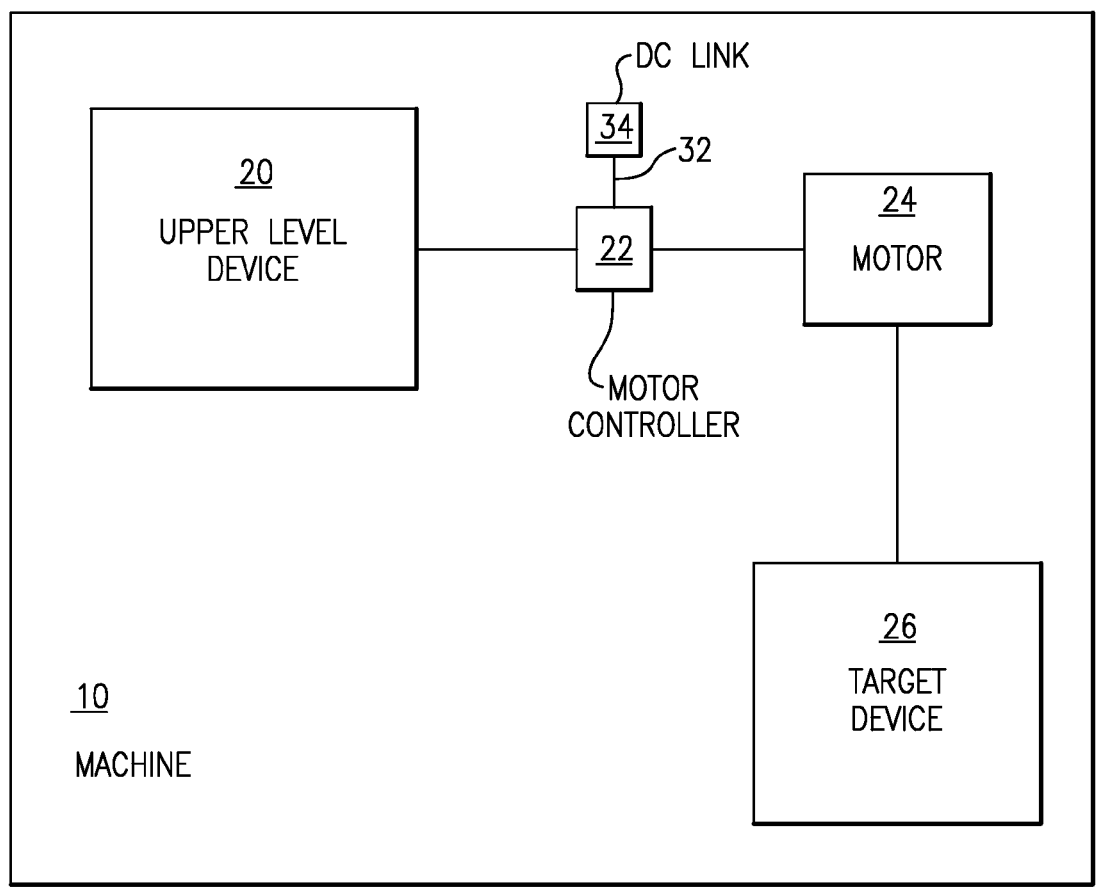
FIG. 1 shows a schematic diagram of a sensorless DC (direct current) motor system.

Referring to FIG. 1, an example brushless DC motor system for a machine 10 includes an upper level device 20, a motor controller 22, a motor 24, and a target device 26. The upper level device 20 sends a signal to the motor controller 22 to rotate or stop the motor 24. The motor 24 then drives the target device 26.

The machine 10 can be, for example, a spacecraft such as a satellite or a probe, or another machine for use in geosynchronous orbit or above. The upper level device 20 can be, for example, the central processing unit of the machine 10. The target device 26 can be, for example, a pump, a fan, or an actuator. In one embodiment, the target device 26 is a thermocontrol pump for a satellite.

Figure 2:
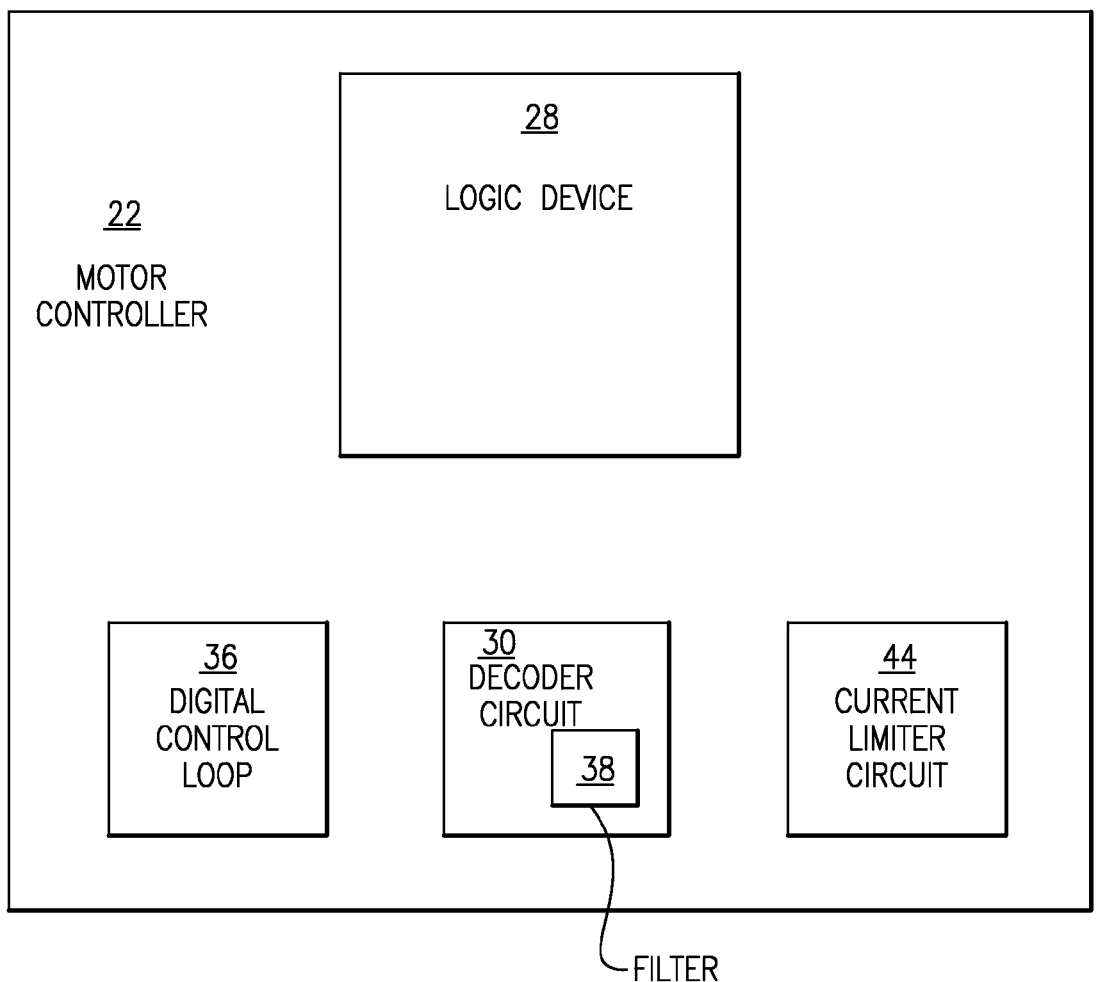
FIG. 2 shows a schematic diagram of an example sensorless DC motor controller of the FIG. 1 system.

Referring to FIG. 2 with continued reference to FIG. 1, in one embodiment the motor controller 22 includes a logic device 28, a decoder circuit 30, a digital control loop 36, and a current limiter circuit 44. The logic device 28 can be, for example, a field programmable gate array (FPGA). The logic device 28 is hardened such that it can withstand high-temperature and high-radiation conditions. The logic device 28 is radiation hardened in this example. Other examples may harden the logic device 28 in other ways. The logic device 28 can employ commutation logic to prevent activation of motor control in incorrect switching states.

The motor controller 22 also includes a back electromotive force (EMF) decoder circuit 30. Back EMF is generated by the relative motion of the rotor of a motor with respect to an external magnetic field. The decoder circuit 30 measures the back EMF and infers the rotor position from the back EMF with respect to the return 32 from the DC link 34. The back EMF signal is filtered, as is discussed below, via a variable cutoff filter 38 to allow selection of a fundamental frequency of the complex back EMF waveform. An alternating current (AC)-coupled amplifier can be used to amplify the back EMF signal. The zero-crossings of the back EMF signal can be determined using a comparator incorporated on the decoder circuit 30. These zero-crossings can then be used to create a waveform to drive the motor 24. In one example, the commutation sequence signal is provided by a Schmidt trigger circuit that creates a pseudo commutation sequence based on the back EMF waveforms. The logic device 28 may read the commutation sequence and provide for proper commutation and adjustment of the DC link 34 voltage in response to a desired speed command.

The direct measurement of the back EMF signal with respect to the DC link return 32 is possible because the DC link voltage is 28 volts; higher voltages can be measured using compensated resistive dividers to reduce the common mode voltages to a suitable level. A variable DC link 34 controller may include forward, full wave or bridge convertors. The inferred rotor position is then used to control the commutation of the motor 24 and the motor 24 speed. A digital control loop 36 can be used to regulate the motor 24 speed. The logic device 28 can also adjust the phase of the derived rotor position signal to compensate for manufacturing and electrical error.

The decoder circuit 30 includes a filter 38 for conditioning the back EMF signal. The filter 38 is controlled by the logic device 28. The filter 38 has variable multiple cutoff frequencies. The cutoff frequencies can be constantly adjusted by the logic device 28 as the rotor speed changes. This allows for minimal phase shift of the back EMF signal. Use of such a filter 38 allows the waveform output from the decoder circuit 30 to mimic the output of motor controllers that include rotor position sensors and employ a 120° switching pattern. This allows the present motor controller design to be relatively easily implemented in conjunction with existing motor hardware.

The motor controller 22 can additionally include a current limiter circuit 44. The current limiter circuit 44 can protect the motor controller 22 from ion-induced radiation upsets in high radiation environments. The current limiter circuit 44 can be configured to measure and respond separately to both peak and average current levels. In one example, the logic device 28 may monitor outputs of the current limiter circuit 44 and adjust both the commutation signal and the DC link 34 in response to the current levels.

The motor 24 can be started by the application of an asynchronous field from the motor controller 22 generated by the logic device 28. Once the motor 24 begins turning, the rotor position can be determined by detection of back EMF as was described above and the logic device 28 can switch to a synchronous field to commutate the motor 24.

Figure 3:
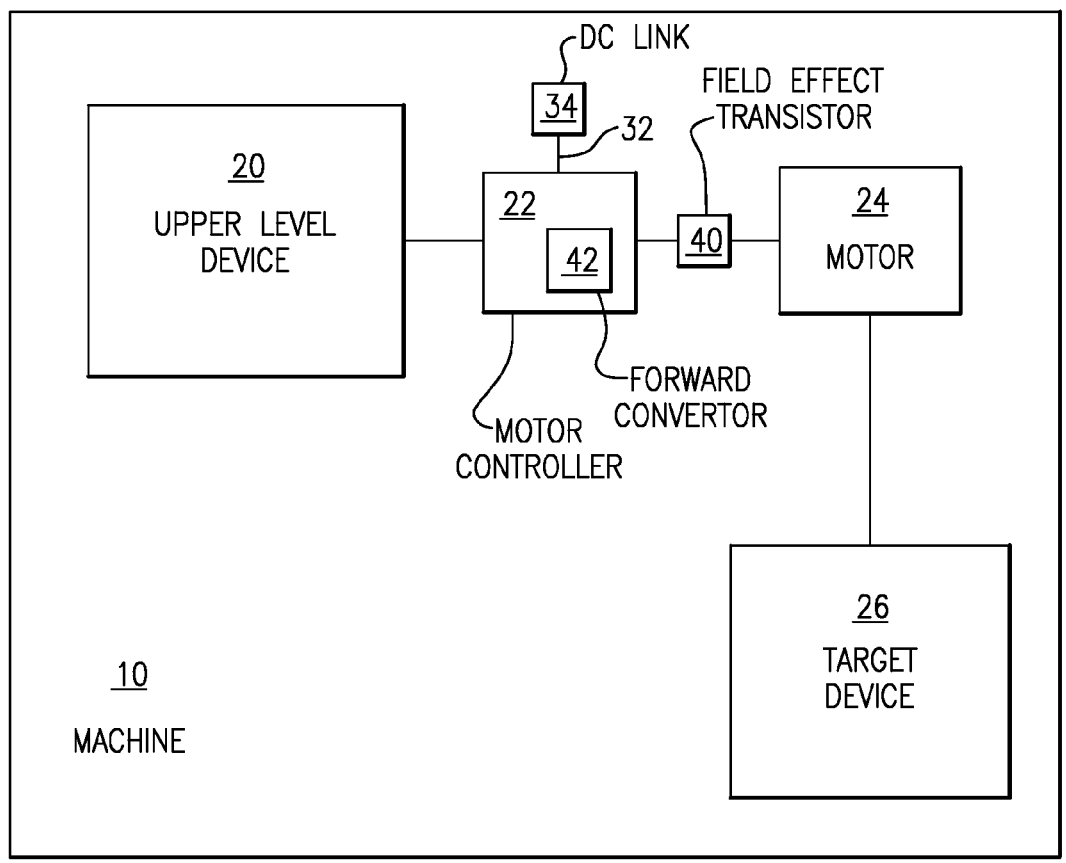
FIG. 3 shows a schematic diagram view of an example FIG. 1 system with variable DC link control.

Referring to FIG. 3, an alternate embodiment of the example brushless DC motor system for a machine 10 includes an upper level device 20, a motor controller 22, a motor 24, and a target device 26. The upper level device 20 sends a signal to the motor controller 22 to rotate or stop the motor 24. The motor 24 then drives the target device 26. The motor 24 receives power from the DC link 34 by one or more FETs 40. Control of the DC link 34 voltage is accomplished by a forward converter 42, which provides a variable DC link 34 voltage to power the motor 24. Power is supplied to the motor 24 via one or more field effect transistors (FETs) 40 and can be varied by amplitude modulation of the DC link signal. Power loss is minimized because the FETs 40 can switch at lower frequencies when the DC link 34 signal is controlled in this way. In one example, the FETs 40 can switch at frequencies in the range of 100-1000 Hz. The FETs 40 can be radiation hardened such they can withstand high-temperature and high-radiation conditions. Also, the DC link return 32 voltage can be kept low enough such that the back EMF can be sensed with respect to the DC link return 32, as was previously discussed.

This design generally decreases the complexity of the motor controller 22 circuitry and eliminates the need for digital signal processing, allowing for the use of a simpler logic device such as an FPGA to wholly replace a more complex motor commutation system. For example, phase bridge drive circuitry can be simple enough to employ opto coupling or a transformer.

The forward converter 42 can additionally be designed for bidirectional current flow, which allows the motor controller 22 to send power back to the upper level device 20 when the machine 10 is operating in a regeneration mode. Also, the forward convertor 42 is capable of performing switching functions at higher frequency than the FETs 40 and can be designed to do so in order to further reduce power loss.

Because the power supplied to the motor 24 is controlled by amplitude modulation of the DC link signal, the frequency spectrum of the electromagnetic interference is constant, as is the radiated magnetic field. This allows for implementation of this design in applications where the magnetic field is being measured nearby the motor 24, such as on a space probe fitted with magnetic field meters.

The example sensorless commutation and speed control techniques discussed above allow for the creation of a brushless DC motor system that can operate in harsh radiation environments while minimizing weight and volume. In one example, the back EMF is measured with respect to the DC link return 32. Features of this example include circuit simplicity and reduced noise, as well as phase angle correction to allow for the generation of sensored signals without sensors. In another example, the power stage is used for commutation only and the speed control is provided by the variation of the DC link 34. Features of this example include the generation of a constant frequency signature, which can be compensated for in any spacecraft as to eliminate interference with complex and sensitive instruments.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:
1. A motor controller system comprising:
a hardened field programmable gate array;
a back electromotive force decoder circuit at least partially controlled by the field programmable gate array;
a filter configured to condition a back electromotive force signal in the decoder circuit, the filter having at least one cutoff frequency, wherein the at least one cutoff frequency is continuously conditioned by the field programmable gate array to reduce phase shift of the back electromotive force signal; and
a current limiter circuit configured to protect the motor, wherein the current limiter circuit is configured to respond separately to an average current and to a peak current.

2. The motor controller system of claim 1, wherein the hardened field programmable gate array is radiation hardened.

3. The motor controller system of claim 1, additionally comprising a digital control loop configured to regulate the speed of a motor.

4. The motor controller system of claim 1, wherein the field programmable gate array includes commutation logic to prevent activation of the motor in an incorrect switching state.

5. The motor controller system of claim 1, wherein a rotor position signal is inferred based on the back electromotive force signal with respect to a direct current link return.

6. The motor controller system of claim 5, wherein the rotor position signal mimics the waveform signal of a 120° switching pattern.

7. The motor controller system of claim 6, wherein the field programmable gate array is configured to adjust a phase of the rotor position signal to compensate for manufacturing and electrical error.

8. The motor controller system of claim 1, wherein the motor is started by application of an asynchronous field by the field programmable gate array, and wherein the asynchronous field switches to a synchronous field after a back electromotive force is detected.

9. The motor controller system of claim 1, wherein the motor controller system is configured to control a motor, wherein the motor drives a target device on a spacecraft.

10. The motor controller system of claim 1, wherein the motor controller system is configured to control a motor which drives a target device, the target device being one of a pump, a fan, or an actuator.

11. The motor controller of claim 1, wherein the decoder circuit additionally comprises an alternating current (AC)-coupled amplifier.

12. The motor controller of claim 1, wherein the decoder circuit additionally comprises a zero-crossing detector.

13. The motor controller of claim 1, wherein the at least one cutoff frequency is configured to be constantly controlled by the field programmable gate array with respect to a speed of a motor.

14. A motor controller system comprising:
a hardened field programmable gate array;
a forward convertor controlled by the field programmable gate array and configured to regulate power supplied to a motor from one or more field-effect transistors by amplitude modulation of a direct current link voltage; wherein a frequency spectrum of a motor-driving magnetic field is constant; and
a current limiter circuit configured to protect the motor, wherein the current limiter circuit is configured to respond separately to an average current and to a peak current.

15. The motor controller system of claim 14, wherein the one or more field effect transistors are radiation hardened.

16. The motor controller system of claim 14, wherein the one or more field effect transistors can accommodate bidirectional current flow.

17. A method for controlling a motor, comprising:
receiving a back electromotive force signal from a rotor of a motor at a back electromotive force decoder circuit in a motor controller, the decoder circuit at least partially controlled by a hardened field programmable gate array, and the motor protected by a current limiter circuit, wherein the current limiter circuit is configured to respond separately to an average current and to a peak current;
conditioning the back electromotive force signal with a filter in the decoder circuit to reduce phase shift of the back electromotive force signal by continuously conditioning at least one cutoff frequency of the filter by the field programmable gate array;
determining a position of the rotor from the conditioned back electromotive force signal; and
supplying a voltage to commutate the motor based on the position of the rotor.

18. The method of claim 17, wherein conditioning comprises minimizing a phase shift of the back electromotive force signal.

19. The method of claim 17, wherein a frequency spectrum of electromagnetic interference is constant.

20. A satellite comprising:
a motor;
a motor controller that receives a signal from an upper level control device, the motor controller including a hardened field programmable gate array; a back electromotive force decoder circuit at least partially controlled by the field programmable gate array; and a filter in the decoder circuit, the filter configured to condition a back electromotive force signal, and the filter having at least one cutoff frequency, wherein the at least one cutoff frequency is continuously conditioned by the field programmable gate array to reduce phase shift of the back electromotive force signal;
a current limiter circuit configured to protect the motor, wherein the current limiter circuit is configured to respond separately to an average current and to a peak current; and
a target device driven by the motor.

21. The satellite of claim 20, wherein the target device is a thermocontrol pump.

* * * * *